United States Patent [19]

Lipschutz

[11] 4,116,024
[45] Sep. 26, 1978

[54] ANTI-THEFT DEVICE FOR MACHINES EQUIPPED WITH A DIESEL OR LIKE ENGINE

[75] Inventor: Paul Lipschutz, Croissy, France

[73] Assignee: Neiman S.A., Courbevoie, France

[21] Appl. No.: 793,411

[22] Filed: May 3, 1977

[30] Foreign Application Priority Data

May 21, 1976 [FR] France ................... 76 15316

[51] Int. Cl.² ............... B60R 25/02; B60R 25/04
[52] U.S. Cl. ................................. 70/201; 70/239;
70/243; 70/252; 74/569
[58] Field of Search ............... 70/192, 193, 194, 201,
70/202, 237, 238, 239, 243, 254, 257, 252;
292/165, 185, 232, 245, DIG. 62; 123/198 B,
198 DB; 74/570, 569; 180/114

[56] References Cited
U.S. PATENT DOCUMENTS

| | | | |
|---|---|---|---|
| 1,218,495 | 3/1917 | Vance | 70/239 |
| 1,647,033 | 10/1927 | Brown | 70/201 |
| 1,786,186 | 12/1930 | Bauermeister | 70/252 |
| 2,866,343 | 12/1958 | Kovacs | 70/237 |
| 3,110,194 | 11/1963 | Roman | 74/569 X |
| 3,591,218 | 7/1971 | Gowland | 292/140 |
| 3,919,868 | 11/1975 | Lipschutz | 180/114 X |

FOREIGN PATENT DOCUMENTS 2,201,790 7/1973 Fed. Rep. of Germany ........... 70/85
1,191,444 5/1970 United Kingdom ................... 70/238

Primary Examiner—Rodney H. Bonck
Attorney, Agent, or Firm—William Anthony Drucker

[57] ABSTRACT

An anti-theft device having a pivoted lever, a cable connected to one end of the lever and controlling a fuel injection pump, the other end of the lever engaging a cam integral with the cylinder of a lock so that when the cylinder is turned by a key in the lock the cable controls the opening and closing of the fuel injection pump.

2 Claims, 2 Drawing Figures

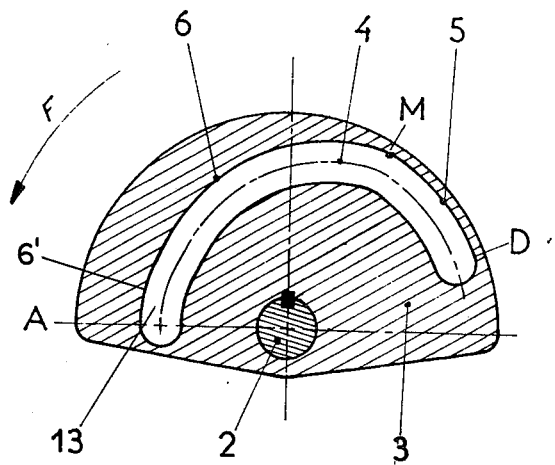
FIG. II
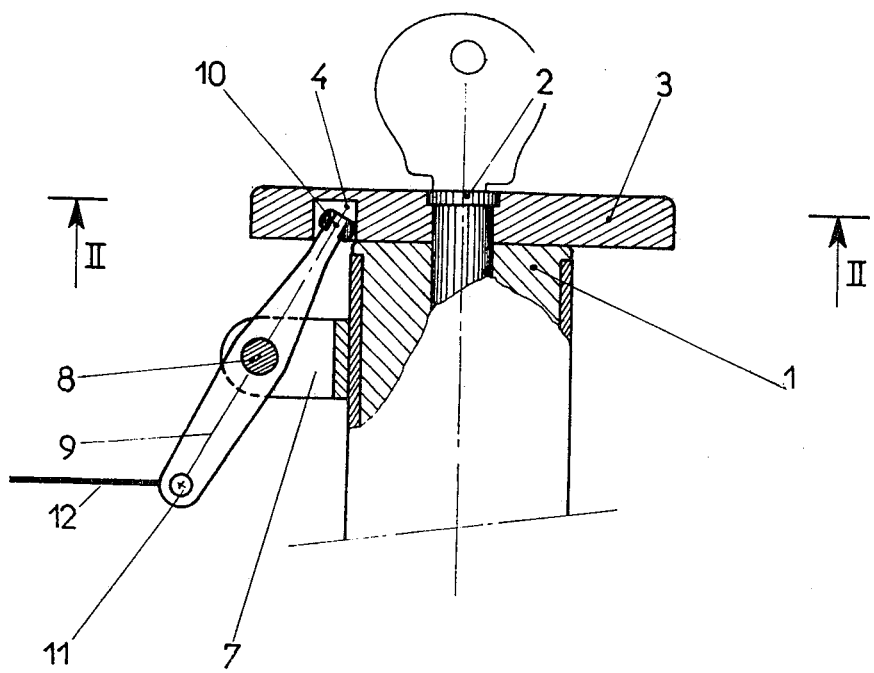
FIG. I

ANTI-THEFT DEVICE FOR MACHINES EQUIPPED WITH A DIESEL OR LIKE ENGINE

BACKGROUND OF THE INVENTION

This invention relates to an anti-theft device of the type described in U.S. Pat. No. 3919868 issued Nov. 18, 1975 Inventor: Paul Lipschutz and in particular concerns giving such an anti-theft device a simple, effective and strong form.

SUMMARY OF THE INVENTION

According to the invention there is provided an anti-theft device for a vehicle having an internal combustion engine and a fuel injection pump, comprising a body, a lock rotor rotatable within said body about an axis, a locking bolt operable by said lock rotor to be moved between locking and unlocking positions in which it locks and unlocks respectively an element of the vehicle essential to the safe operation of that vehicle, an electrical switch operable by said lock rotor and adapted for connection in a circuit starting said vehicle, locking bolt drive means operable by said lock, a drive plate provided exteriorly to said body connected to said lock rotor and perpendicular to the axis thereof having a cam groove formed on that side of said plate which is adjacent the body, said groove lying outside the body and a portion of which groove is eccentric to the axis of rotation of the lock rotor, said grooved side being in a flat plane seating on said body and a lever pivotably mounted between its ends on the outside of said body about an axis at right angles to the rotor axis between the ends of said body, one end of said lever being in engagement with said groove and the other end being movable substantially linearly in a direction at right angles to the rotor axis and in a plane containing said rotor axis and connectible to said fuel injection pump to transmit pump opening and closing movement to said pump upon operation of said lock rotor, said locking bolt drive means first causing said bolt to be moved to said unlocking position before said pump is opened as the lock rotor is moved in a direction to cause pump opening movement of said drive plate and lever, and when said lock rotor is moved in the direction to cause pump closing movement of said drive plate and lever, first causing said pump to be closed before said bolt is moved to said locking position.

BRIEF DESCRIPTION OF THE DRAWING

FIG. 1 is a diagrammatic axial sectional view, partly in elevation of a part of an anti-theft device according to an embodiment of the invention; and FIG. 2 is a sectional view taken on line II—II of FIG. 1.

DESCRIPTION OF THE PREFERRED EMBODIMENT

I hereby incorporate by reference all of the disclosure of earlier U.S. Pat. No. 3919868 issued Nov. 18, 1975 Inventor: Paul Lipschutz.

The anti-theft device comprises a cylindrical lock constituted by a stator body 1 and a rotor or cylinder 2. A plate 3, fixed to the free end of the rotor 2 and perpendicular to the axis of latter, has on the side thereof facing the rotor a groove 4 comprising a portion 5 coaxial with the rotor 2 and a portion 6 which progressively approaches the axis of the rotor.

The stator 1 of the lock comprises a bracket 7 in which there is journalled a pin 8 which is orthogonal to the axis of the lock, said pin being integral with a lever 9. One end 10 of the lever 9, which end may be constituted by a roller, is engaged in the groove 4 and the other end 11 of the lever 9 is connected to a cable 12 connected to an element controlling the injection pump shown at 60 in said U.S. Pat. No. 3919868.

The device just described operates in the following manner.

In the stop position A of the anti-theft device (FIG. 1), the end 10 of the lever 9 is at the end of the groove 4 which is the nearer to the rotor 2, that is to say, the end of the portion 6 opposed to the portion 5. The cable 12 is slack and the injection pump is closed. When the rotor 2 is rotated in the direction of arrow F (FIG. 2), the end 10 of the lever 9 travels through the portion 6 of the groove 4 and therefore progressively moves away from the rotor 2. The cable 12 is progressively pulled and the injection pump is completely open when the point M, corresponding to normal operation, is reached. When the rotor 2 is continued to be rotated in the direction of arrow F, the end 10 of the lever 9 travels through the portion 5 of the groove 4 and this produces no movement of the lever 9 and leaves the injection pump open. This movement is stopped when the end 10 reaches the point D corresponding to the actuation of the starter. The movement in the opposite direction causes the pump to be closed in the same manner.

As in the U.S. Pat. No. 3919868, a lost motion means may be interposed between the lock and the transmission element constituted by the cable 12. This lost motion means may be constituted by a circular portion 6' at the start of the portion 6 of the groove 4 which permits withdrawing the locking bolt member without actuating the injection pump.

I claim:

1. In an anti-theft device for a vehicle having an internal combustion engine and a fuel injection pump, comprising a body, a lock rotor rotatable within said body about an axis, a locking bolt operable by said lock rotor to be moved between locking and unlocking positions in which it locks and unlocks respectively an element of the vehicle essential to the safe operation of that vehicle, an electrical switch operable by said lock rotor and adapted for connection in a circuit starting said vehicle, and locking bolt drive means operable by said lock rotor, the provision of (a) a drive plate provided exteriorly to said body connected to said lock rotor and perpendicular to the axis thereof having a cam groove formed on that side of said plate which is adjacent the body, said groove lying outside the body and a portion of which groove is eccentric to the axis of rotation of the lock rotor, said grooved side being in a flat plane seating on said body; and (b) a lever pivotably mounted between its ends on the outside of said body about an axis at right angles to the rotor axis between the ends of said body, one end of said lever being in engagement with said groove and the other end being movable substantially linearly in a direction at right angles to the rotor axis and in a plane containing said rotor axis and connectible to said fuel injection pump to transmit pump opening and closing movement to said pump upon operation of said lock rotor, said locking bolt drive means first causing said bolt to be moved to said unlocking position before said pump is opened as the lock rotor is moved in a direction to cause pump opening movement of said drive plate and lever, and when said lock rotor is moved in the direction to cause pump closing movement of said drive plate and lever, first causing said pump to be closed before said bolt is moved to said locking position.

2. A device according to claim 1, including lost motion means in the form of a further portion of said cam groove lying on the arc of a circle centred in the axis of rotation of the lock, said lost motion means being effective to delay activation of said lever until said bolt is moved to said unlocking position as the lock is moved in a direction to cause opening movement of said lever.

* * * * *